United States Patent [19]
Colyn

[11] 3,846,690
[45] Nov. 5, 1974

[54] DEVICE FOR CHARGING AN ELECTRIC POWER STORAGE ELEMENT TO A PREDETERMINED VOLTAGE

[75] Inventor: Roland Colyn, Le Perreux, France

[73] Assignee: Compagnie Generale d'Electricite, Paris, France

[22] Filed: July 11, 1973

[21] Appl. No.: 378,106

[30] Foreign Application Priority Data
July 11, 1972 France .............................. 72.25037

[52] U.S. Cl. .................................... 320/1, 331/111
[51] Int. Cl. ........................... H03k 3/30, H02j 7/00
[58] Field of Search ................ 320/1; 331/111, 112

[56] References Cited
UNITED STATES PATENTS

| | | |
|---|---|---|
| 3,331,034 | 7/1967 | Massoll .............................. 331/111 |
| 3,417,306 | 12/1968 | Knak ...................................... 320/1 |
| 3,515,973 | 6/1970 | Powell .............................. 331/111 |
| 3,721,885 | 3/1973 | McKeown et al ...................... 320/1 |

*Primary Examiner*—Stuart N. Hecker
*Attorney, Agent, or Firm*—Sughrue, Rothwell, Mion, Zinn & Macpeak

[57] ABSTRACT

A device for charging an electric power storage element to a predetermined voltage. This device comprises an induction coil comprising a primary winding connected to a continuous current source by a transistor, and a secondary winding connected to the condenser. The intensity of the current supplied to the coil is lower than a predetermined threshold value. This device comprises means for preventing the transistor from being conductive while the coil is discharging into the condenser.

2 Claims, 2 Drawing Figures

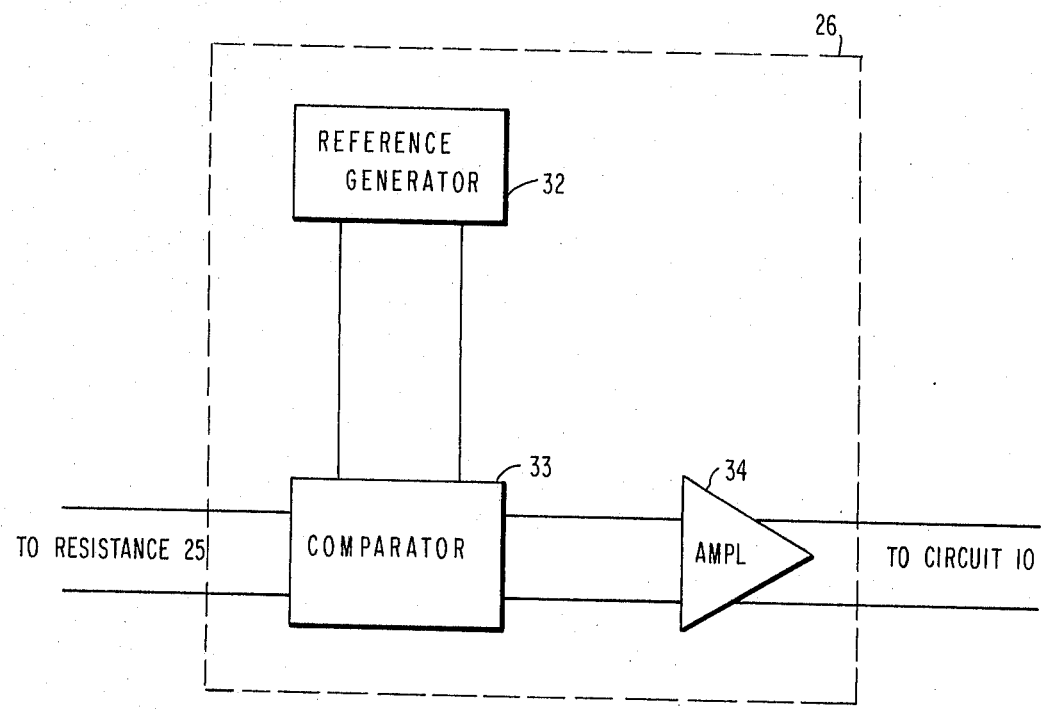

DEVICE FOR CHARGING AN ELECTRIC POWER STORAGE ELEMENT TO A PREDETERMINED VOLTAGE

BACKGROUND OF THE INVENTION

1. Field of the Invention

The present invention relates to devices for charging an electric power storage element to a predetermined voltage, and, more particularly, to devices for charging a condenser to a predetermined voltage.

2. Description of the Prior Art

A device for charging a condenser to a predetermined voltage, comprising a continuous electric current source and a voltage converter supplied by this source, is already known in the art. This converter comprises an induction coil comprising a primary winding, the ends of which are connected to the terminals of the source, and a secondary winding, the ends of which are connected across a rectifier to the terminals of the storage condenser, a transistor connected by its main electrodes in series with the primary winding of the coil, reaction means acting on the control electrode of the transistor so as to cause an oscillation of the current passing through the primary winding of the coil, thus producing a rectified, alternating voltage at the terminals of the condenser, and means for interrupting the charging of the condenser when the voltage at the terminals reaches the predetermined value.

The device described above has certain disadvantages. The intensity of the current flowing in the transistor during operation of the device reaches very high values, thus necessitating the use of a very powerful, and hence large transistor. In addition, the output of the device is relatively low owing to considerable losses in the induction coil of the converter.

SUMMARY OF THE INVENTION

The object of the present invention is to obviate these disadvantages. The present invention relates to a device for charging an electric power storage element to a predetermined voltage. This device comprises a continuous electric current source, an induction coil comprising a primary winding, the ends of which are connected respectively to the terminals of the source in order to produce a charging current of this coil, and a secondary winding, the ends of which are connected respectively to the terminals of the storage element, and an interrupter connected in series with the primary winding. The device according to the invention further comprises means for controlling the interrupter. By opening the interrupter, these control means are capable of causing the discharge into the storage element of the charging energy of the coil. The device further comprises a first rectifier connected in series with the secondary winding. It also comprises means sensitive to the charging voltage of the storage element. These means interrupt the charging of this storage element when the voltage reaches the predetermined value. These means are characterized in that they comprise first means sensitive to the charging current of the coil so as to control the opening of the interrupter when the intensity of the current reaches a predetermined threshold value, and second means sensitive to the discharge current of the coil flowing to the storage element so as to keep the interrupter open for the entire discharging operation. The control means for the interrupter are designed to keep it closed when the first and second opening means are not active.

Other features, objects and advantages of the present invention will be made apparent in the following detailed description of a preferred embodiment thereof provided with reference to the accompanying non-limitative drawing, in which:

BRIEF DESCRIPTION OF THE DRAWING

FIG. 2 is a more detailed diagrammatic illustration of the threshold current of FIG. 1.

DESCRIPTION OF THE PREFERRED EMBODIMENT

Figure 1:
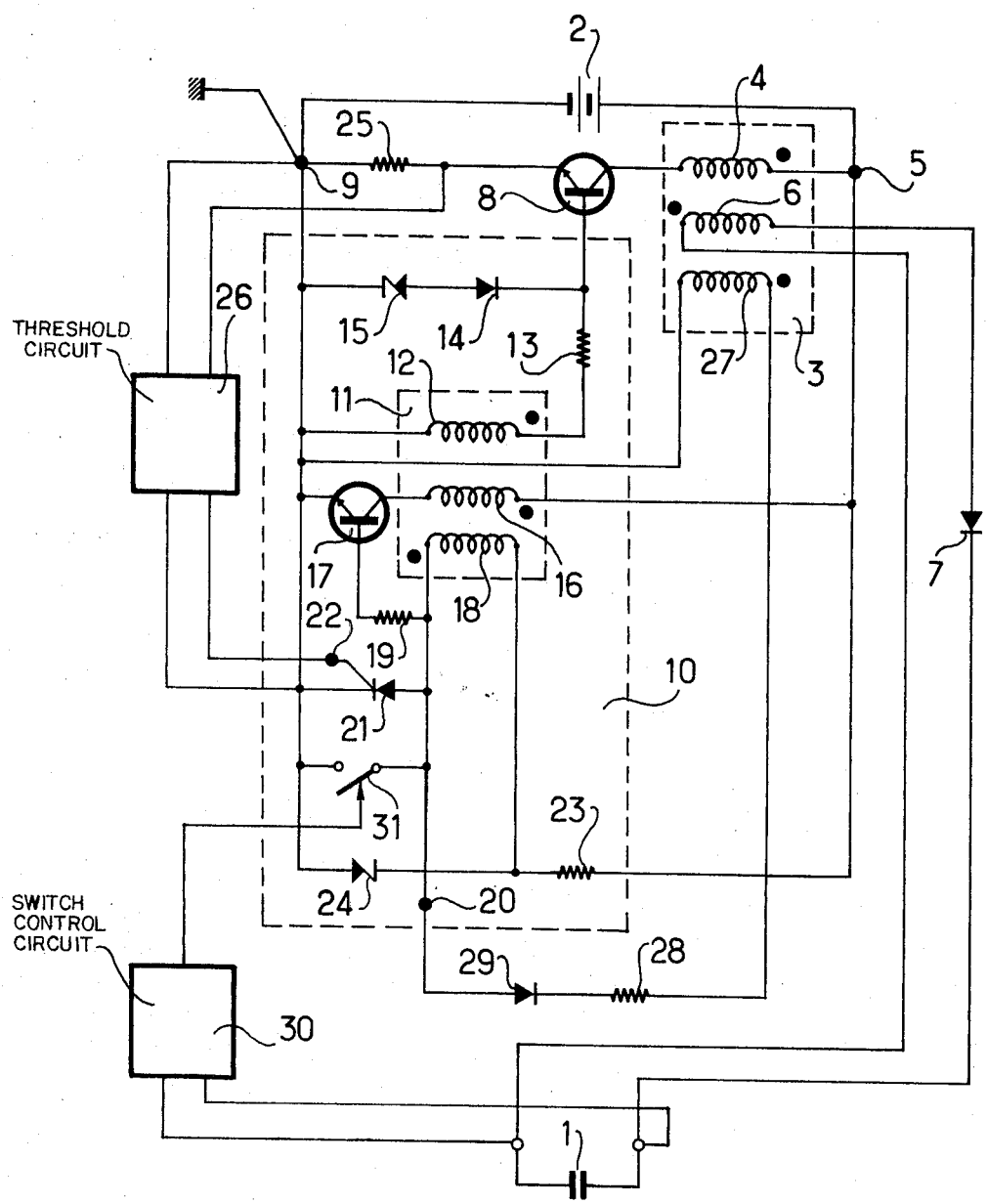
FIG. 1 is a diagrammatic view of an embodiment of the device according to the invention.

The accompanying FIG. 1 represents a device for charging an electric power storage element, for example, a condenser 1, to a predetermined voltage. This device comprises a continuous electric current source 2 such as an accumulator or battery, an induction coil 3 connected to the source 2 so as to be charged by this source. This coil 3 is designed to be discharged into the condenser 1. The coil 3 comprises a primary winding 4, one end of which is connected to a terminal 5 of the source 2, this terminal 5 being, for example, at a positive potential, and a secondary winding 6, the ends of which are connected respectively to the terminals of the condenser 1 across a rectifier 7 connected in series with the winding 6. This device further comprises an interrupter, for example, an NPN transistor 8, the collector of which is connected to the other end of the primary winding 4 and the emitter of which is connected to the other terminal 9 of the source 2, this terminal 9 being connected, for example, to a zero potential and to the mass of the device.

The device represented in FIG. 1 comprises means for controlling the transistor 8. These means consist of a control circuit 10 designed to polarize the base of the transistor 8. This circuit 10 may comprise, for example, an induction coil 11 comprising a winding 12, one end of which is connected by way of a resistance 13 to the base of the transistor 8 and the other end of which, is connected to the terminal 9. Between the base of the transistor 8 and the terminal 9 is disposed a branch, comprising in series, but in the reverse direction, a diode 14 and a Zener diode 15, the cathode of the Zener diode 15 being connected to the terminal 9. The coil 11 further comprises a winding 16, one end of which is connected to the terminal 5 and the other end of which is connected to the collector of an NPN transistor 17, the emitter of which is connected to the terminal 9. The coil 11 also comprises a winding 18, one end of which is connected to the base of the transistor 17 across a resistance 19 and to an input terminal 20 of the circuit 10. To the terminal 20 is connected the anode of a thyristor 21, the cathode of which is connected to the terminal 9 and the control of which is connected to another input terminal 22 of the circuit 10. The circuit 10 also comprises a branch disposed between the terminals 5 and 9, comprising in series a resistance 23 and a Zener diode 24, the anode of which is connected to the terminal 9. The common junction between the cathode of the Zener diode 24 and the resistance 23 is connected to the other end of the winding 18 of the coil 11. The control circuit 10 may also comprise an interrupter 31, the terminals of which are connected respectively to the terminals 20 and 9.

The device represented in FIG. 1 comprises means for controlling the blocking of the transistor 8 when the intensity of the charging current of the coil 3 reaches a predetermined threshold value. The blocking means consist, for example, of a resistance 25 connected in series in the charging circuit of the coil 3 between the emitter of the transistor 8 and the terminal 9, and of a threshold circuit 26, the input of which is connected to the terminals of the resistance 25 and the output of which is connected, on the one hand, to the input terminal 22 of the control circuit 10 and, on the other hand, to the terminal 9. The threshold circuit 26 can comprise, in a known arrangement, a generator 32 of a reference voltage, a comparator circuit 33, and an amplifier 34, as shown in FIG. 2.

This device also comprises means for keeping the transistor 8 blocked during the entire discharging operation of the coil 3 into the condenser 1. These blocking means may consist, as represented, of a third winding 27 of the coil 3, one end of which is connected to the terminal 9 and the other end of which is connected to the input terminal 20 of the control circuit 10 across a resistance 28 and a diode 29 arranged in series. The anode of the diode 29 is connected to the terminal 20.

The device represented in FIG. 1 also comprises a switch control circuit 30, which is connected to the terminals of the condenser 1. This circuit 30 is designed to control the interrupter 31 of the control circuit 10.

The device represented in the FIG. 1 operates as follows: In the beginning, the condenser 1 is discharged and no action is exerted on the interrupter 31, which is normally open, by the device 30 connected to the terminals of the condenser. As soon as the source 2 is connected to the terminals 5 and 9, there is produced at the common junction between the Zener diode 24 and the resistance 23 a positive potential lower than that of the terminal 5. This positive potential polarizes respectively the base of the transistor 17 by way of the winding 18 of the coil 11 and the resistance 19, and it also positively polarizes the anode of the thyristor 21 by way of the winding 18. The positive polarization of the base of the transistor 17 is sufficient to start the unblocking thereof. A current flows into the winding 16 and an electromotive induction force is produced in the windings 12 and 18 of the coil 11. To facilitate comprehension of the diagram, a dot has been marked on the figure at one end of each winding of the coil 11. This dot indicates the positive pole of the electromotive force induced into these windings when the transistor 17 is conductive. It will be noted that the electromotive force induced into winding 18 tends to increase the polarization voltage of the base of the transistor 17 and thus facilitates the unblocking of the transistor. The induced voltage which appears at the terminals of the winding 12 positively polarizes the base of the transistor 8, which is then unblocked, the resistance 13 limiting the base current of this transistor. A current then flows into the winding 4 of the coil 3 and an electromotive force induced at the terminals of the windings 6 and 27 of this coil 3, is produced. A dot has also been marked at one end of each of the windings of the coil 3. This dot also indicates the positive pole of the electromotive force induced into the windings when the transistor 8 is conductive. The electromotive force induced into the windings 27 and 6 is unable to produce any current owing to the diodes 29 and 7, respectively, which are arranged in the blocking direction. The current which flows into the winding 4 of the coil 3 increases progressively which causes an increase in the voltage at the terminals of the resistance 25 disposed in series in the charging circuit of the coil 3. This voltage at the terminals transferred to the input of the threshold circuit 26 is compared in comparator 33 to the reference generator 32 of this circuit (see FIG. 2). As long as the voltage at the terminals of the resistance 25 is lower than this reference voltage, that is, as long as the intensity of the current flowing into the resistance 25 is lower than a predetermined threshold I, no signal appears at the output terminals of the circuit 26. The control electrode of the thyristor 21 in circuit 10 is not polarized and the thyristor thus remains blocked.

When the value of the voltage at the terminals of the resistance 25 reaches that of the reference voltage, a signal appears at the terminals of the comparator of the circuit 26. This signal, amplified in the amplifier 34 of this circuit, is applied between the cathode and the control electrode of the thyristor 21, which is then unblocked. The potential of the base of the transistor 17 then drops to zero which causes the transistor to be blocked. As a result of the reduction in the current which flows into the winding 16, electromotive polarity forces opposite to those represented by the dots induced at the terminals of the windings 12 and 18 of the coil 11. The electromotive force induced at the terminals of the winding 18 is unable to produce any current owing to the Zener diode 24 disposed in the blocking direction. The electromotive force induced at the terminals of the winding 12 negatively polarizes the base of the transistor 8, the absolute value of this polarization voltage being limited to a value lower than the breakdown voltage of the transistor, through the Zener diode 15. The transistor 8 blocks, causing a drop in the current in the winding 4 of the coil 3 and the reversal of the polarity of the electromotive forces induced at the terminals of the windings 6 and 27 of the coil 3. The electromotive force induced into the winding 6 causes a charging current of the condenser 1 to be produced across the rectifier 7. However, the reduction in the current in the winding 4 causes a drop in the voltage at the terminals of the resistance 25, thus cancelling out the output voltage of the circuit 26. The electromotive force induced into the winding 27 of the coil 3 during the blocking of the transistor 8 produces an electromotive force which negatively polarizes through the resistance 28 and the diode 29 connected in series in the forward direction, the anode of the thyristor 21 which blocks this thyristor. However, the electromotive force also negatively polarizes the base of transistor 17, thus causing the transistor to remain blocked. The transistor 17 is kept in the blocked state as long as the voltage of the electromotive force induced at the terminals of the winding 27 is not zero, that is, as long as a charging current of the condenser 1 comes from the winding 6 of the coil 3. When this charging current cancels out, the base of transistor 17 is again positively polarized through the resistance 23 and the winding 18. As the interrupter 31 is still open, the transistor is again unblocked and a new operating cycle, identical to the one described, commences.

If L is the self-induction coefficient of the winding 4 of the coil 3, I being, as was indicated above, the predetermined threshold of the intensity of the current flowing into the winding 4 and the resistance 25, the condenser 1 received during the operating cycle described above an electrical energy $E_1$, the approximate value of which is: $\frac{1}{2} L I^2$. In general, this energy $E_1$ is considerably lower than the energy $E$, provided by the relation:

$$E = \frac{1}{2} CV^2$$

to which it is desired to charge the condenser 1. V is the predetermined voltage to which it is desired to charge the condenser 1 and C is its capacity. The voltage $V_1$ of this condenser is thus lower than V.

When E equals approximately $n \times E_1$, n being a whole number, n operating cycles will be required for the condenser 1 to be charged to voltage V. At this particular instant, the device 30 connected to the terminals of the condenser 1, controls the closing of the interrupter 31. As soon as the interrupter 31 is closed, the transistor 17 is blocked and charging of the condenser 1 is terminated.

As has been described in the description of the invention which is illustrated by FIG. 1, the intensity of the current traversing the transistor 8 remains lower than a predetermined threshold value during operation of the device. Accordingly, the device according to the invention has the advantage over the prior art device described above, in that a less powerful, and thus smaller transistor can be used therein. Furthermore, as the magnetic flux of the induction coil 3 varies between narrower limits, the hysteresis losses in this coil are lower and thus the output of this device is better.

The device according to the invention can be used in particular for charging electrical energy storage condensers in laser generators.

The present invention is obviously not limited to the embodiment which has been described and represented by way of example only. Without departing from the scope of the invention, it is possible to change certain arrangements and to replace certain means by equivalent means.

What is claimed is:

1. A device for charging an electric power storage element to a predetermined voltage, said device comprising:

a continuous electric current source, an induction coil comprising a primary winding, the ends of which are connected respectively to the terminals of said source to produce a charging current of this coil, and a secondary winding, the ends of which are connected respectively to the terminals of said storage element, an interrupter in series with said primary winding, control circuit means for controlling the opening and closing of said interrupter to produce by the opening of this interrupter the discharge into said electric power storage element of the charge of said coil, a first rectifier connected in series with said secondary winding, means sensitive to the charging voltage of said storage element to interrupt the charging of this storage element when this voltage reaches the predetermined value; said device further comprising:

first means sensitive to the charging current of said coil and operative to open said interrupter when the intensity of the charging current reaches a predetermined threshold value, and second means sensitive to the discharging current of said coil in said storage element and operative to keep the interrupter open during the entire discharging operation, said control circuit means controlling said interrupter being operative to keep said interrupter closed when said first and second means are not operative.

2. A device according to claim 1, characterized in that:

said interrupter consists of a transistor comprising two main electrodes and an auxiliary electrode for the control thereof, said transistor being connected by its main electrodes in series with said primary winding in the charging circuit of said coil said control circuit means for controlling the opening and closing of said interrupter consisting of a control circuit designed to polarize the auxiliary electrode of said transistor, said first means sensitive to the charging current of said coil to open said interrupter, comprising a resistance in series in the charging circuit of said coil, a threshold circuit, the input of which is connected to the terminals of said resistance, this threshold circuit comprising a generator of a reference voltage, a comparator circuit and an amplifier, the output of this threshold circuit being connected to a first input of said control circuit, and in that said second means comprises a third winding magnetically coupled to the primary and secondary windings of said coil, this third winding being connected to a second input to said control circuit to keep said transistor open so long as the current induced in said third winding by the discharge current continues to flow therein.

* * * * *